United States Patent [19]

Fujime

[11] 4,430,675
[45] Feb. 7, 1984

[54] STILL PICTURE RECORDING AND REPRODUCING SYSTEM

[75] Inventor: Toshiro Fujime, Takatsuki, Japan

[73] Assignee: Sanyo Electric Co., Ltd., Osaka, Japan

[21] Appl. No.: 249,889

[22] Filed: Apr. 1, 1981

[30] Foreign Application Priority Data

May 2, 1980 [JP] Japan ............................. 55-61131[U]
Jul. 18, 1980 [JP] Japan ................................. 55-99143
Nov. 10, 1980 [JP] Japan ............................... 55-158627

[51] Int. Cl.³ ......................... H04N 5/781; H04N 5/93
[52] U.S. Cl. .................................... 358/342; 360/9.1; 360/10.1
[58] Field of Search .................. 360/10, 9, 30, 99, 33, 360/37, 36, 9.1, 10.1, 33.1, 36.1, 37.1, 22, 23; 358/127, 312, 335, 342, 315, 320

[56] References Cited

U.S. PATENT DOCUMENTS 3,564,127 2/1971 Sziklai ................................... -360/9
3,919,716 11/1975 Yumde .................................. 360/10
4,193,084 3/1980 Yamagiwa ............................ 360/30

Primary Examiner—Alan Faber
Attorney, Agent, or Firm—Armstrong, Nikaido, Marmelstein & Kubovcik

[57] ABSTRACT

A still vision recording and reproducing system for use in video tape recorder includes a field memory constituted by RAMs and recording device constituted by a floppy-disc recorder, and operates in recording mode and playing mode. During the recording mode, television signal converted into digital form is memorized in the field memory, and in turn, read out at slow speed and converted into analogue form for being recorded in the floppy-disc recorder. During the playing mode, the television signal which has been recorded in the floppy-disc recorder is reproduced and supplied to the field memory in digital form, and in turn, it is read out at high speed and converted into digital form for being used to establish a still picture.

7 Claims, 10 Drawing Figures

STILL PICTURE RECORDING AND REPRODUCING SYSTEM

BACKGROUND OF THE INVENTION

The present invention relates to a video tape recorder and, more particularly, to a still vision recording and reproducing system for use in video tape recorder.

The still vision recording and reproducing system generally includes a field memory and a recording device. The input of the field memory is selectively connectable to either one of a source of video, or television, signal and the output of the recording device, and the output of the field memory is selectively connectable to either one of a television signal processing stage or the input of the recording device. When the system is in the recording mode, the input and output of the field memory are connected to the television signal source and the input of the recording device, respectively, for temporarily memorizing the television signal of one field in the field memory, and sequentially reading out and recording the temporarily memorized television signal in the recording device. Since the recording device has a certain capacity, it may record a plurality of fields of television signal by carrying out the memorizing operation repeatedly. Then, when the system is in the reproducing mode, the input and output of the field memory are connected to the output of the recording device and the television signal processing stage, respectively, for reading out the recorded television signal in the designated section in the recording device, and temporarily memorizing the read out television signal in the field memory. The television signal thus memorized in the field memory is sequentially taken out repeatedly and applied to the television signal processing stage to produce a still picture on a cathode ray tube.

In the above arrangement, since the field memory generally includes shift register and memory unit, such as RAM, the television signal is converted into digital form before it is applied to the field memory. For example, the television signal is converted into digital form with sampling rate at frequency of 10 MHz and quantization level of 6 bits per each sampling. Therefore, it is understood that the digital television signal is sent to the field memory at the rate of 60 megabits per second. Since it takes 1/60 second to send one field, the field memory is arranged to memorize 1 megabit. Thereafter, the memorized digital television signal is sequentially sent to the recording device at a rate much slower than the original rate.

Furthermore, for the recording device, it has been a common practice to employ a so-called foil-, or floppy-, disc recorder. The floppy-disc recorder includes a thin film disc that rotates at a high speed, e.g., 360 rpm. The thin film disc has a plurality of tracks, such as 77 tracks, on each of the opposite faces, and is capable of recording 250 to 500 kilobits per second. When the employed floppy-disc recorder is a type that records 500 kilobits per second and rotates the film disc at 360 rpm, it can record $500 \times 10^3 \times 1/6 \times 0.9 = 75 \times 10^3$ (bits) in each track, provided that 0.9 is an effective utilizing rate of each track. Therefore, in order to memorize television signal of one field, it is necessary to use $(10^6 \div 75 \times 10^3 = 13.3)$ 14 tracks.

SUMMARY OF THE INVENTION

Accordingly, it is a primary object of the present invention to provide a still vision recording and reproducing system in which the floppy-disc recorder employed therein may record greater number of fields of television signal than that in the prior art system.

It is another object of the present invention to provide a still vision recording and reproducing system of the above described type in which the deviation of reproduced television signal caused by the wow flutter in the floppy-disc recorder can be eliminated.

In accomplishing these and other objects, a still vision recording and reproducing system according to the present invention comprises first switch means having first, second and third terminals. The third terminal is selectively connectable to either one of the first and second terminals, and the first terminal is adapted to receive a television signal. A memory means is connected to the third terminal of the first switch means for memorizing the television signal. A second switch means includes first, second and third terminals which are arranged in the same manner as the first switch means, and its third terminal is connected to the memory means and its first terminal is adapted to supply television signal of still vision. A frequency modulator is connected to the second terminal of the second switch means, and a disc recorder means is connected to the frequency modulator. A demodulator is connected between the disc recorder means and the second terminal of the first switch means. The system further comprises mode control means for controlling the mode of operation between recording mode and playing mode. During the recording mode, the first switch means is so actuated as to connect its third terminal with its first terminal for writing the television signal in the memory means, and the second switch means is so actuated as to connect its third terminal with its second terminal for reading and sending the written television signal in expanded form in time domain through the frequency modulator to the disc recorder means for recording the television signal. During the playing mode, the first switch means is so actuated as to connect its third terminal with its second terminal for writing the television signal, which has been reproduced from the disc recorder means and demodulated in the demodulator, in the memory means, and the second switch means is so actuated as to connect its third terminal with its first terminal for reading and sending out the written television signal in compressed form in time domain for the establishment of a still vision.

In one embodiment, this invention provides a still vision recording and reproducing system comprising a still vision recording and reproducing system which has means for supplying a television signal, mode control means which have a recorder and a player responsive to the signal for selectively controlling the mode of operation of the signal between a recording mode and a playing mode, respectively. The mode control means also has two minor modes which include a fast writing mode and a slow reading mode, and a slow writing mode and a fast reading mode, respectively, for selectively producing the desired still vision. Also low frequency pulse supplying means is provided for supplying low frequency pulses to said recorder for recording the low frequency pulses on the recorder for recording and playing the low frequency pulses simultaneously with the recording of the television signal for sequentially reproducing the signal in the fast and slow writing and reading minor modes, respectively, to produce the still vision in accordance with the sequence of the respective modes that were selected. With the proper selection of elements, as described in more detail hereinafter, the desired still vision recording and reproducing system is achieved.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE INVENTION

Figure 1:
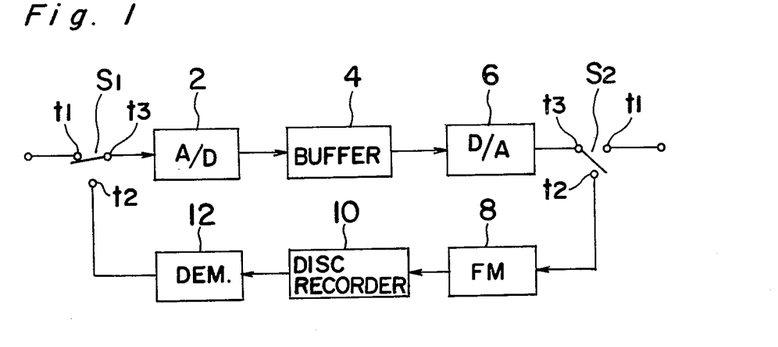
FIG. 1 is a block diagram showing a fundamental arrangement of a still vision recording and reproducing system according to the present invention.

Referring to FIG. 1, there is shown a fundamental block diagram of still vision recording and reproducing system according to the present invention. The system comprises switches S1 and S2, each having terminals t1, t2 and t3. The terminal t1 of the switch S1 is connected to a source of television signal (not shown), and the terminal t1 of the switch S2 is connected to a television signal processing stage (not shown) where the television signal is used to a reproduce a picture on a cathode ray tube (not shown). Analogue-to-digital converter 2, buffer memory 4 and digital-to-analogue converter 6 are connected in series between the terminals t3 of the respective switches S1 and S2. The system further comprises frequency modulator 8, floppy-disc recorder 10 and demodulator 12, which are connected in series between the terminals t2 of the respective switches S1 and S2.

The system operates in two major modes which are recording mode and playing mode, and each major mode has two minor modes. Particularly, the recording mode includes fast writing (FW) mode and slow reading (SR) mode, and the playing mode includes slow writing (SW) mode and fast reading (FR) mode.

When the recording mode is selected, the system is first set in the fast writing mode in which the switch S1 connects its terminal t3 with its terminal t1, as shown, to supply one field of television signal to the A/D converter 2. The converted digital television signal is memorized in RAMs constituting the buffer memory 4. Immediately thereafter, the mode is automatically changed to the slow reading mode in which the switch S2 connects its terminal t3 with its terminal t2, as shown. In the slow reading mode, the memorized digital signal is read out at the rate slower than the rate for memorizing the television signal in the buffer memory 4 during the fast writing mode. For example, the rate of slow reading is approximately 1/27 of the rate of fast writing. Accordingly, the frequency of the television signal is reduced from about 4 MHz to about 148 KHz. The read out digital signal is converted into analogue television signal by the D/A converter 6 and is further supplied to the frequency modulator 8 which has a modulation frequency between, e.g., 200 and 250 KHz. The frequency modulated signal is then recorded in the floppy-disc recorder 10, thus completing the recording mode.

Thereafter, when the playing mode is selected, the system is first set in the slow writing mode in which the switch S1 connects its terminal t3 with its terminal t2. In this slow writing mode, the floppy-disc recorder 10 reproduces the FM television signal which is in turn demodulated in the demodulator 12 to produce analogue television signal. Thereafter, the analogue television signal is converted into digital television signal by the A/D converter 2 and, then is memorized in the buffer memory 4. When the buffer memory 4 completes the memorizing of the digital television signal, the system is automatically changed to fast reading mode in which the switch S2 connects its terminal t3 with its terminal t1. In the fast reading mode, the memorized digital signal is read out at the rate faster than the rate for memorizing the television signal in the buffer memory 4 during the slow writing mode. For example, the rate of fast reading is approximately 27 times the rate of slow writing. Accordingly the frequency of the television signal is returned to its original frequency, i.e., about 4 MHz. The read out digital signal is converted into analogue television signal by the D/A converter 6 and is applied to the television signal processing stage for producing the still picture on the cathode ray tube. In order to maintain the still picture on the cathode ray tube, the fast reading mode is repeated automatically until the operator resets the playing mode.

According to the still vision recording and reproducing system described above, since it takes about $(0.9 \times 1/6)$ second to record one track of the floppy-disc, and since it takes about $(27 \times 1/60)$ second to supply one field of television signal to the floppy-disc recorder 10, it only takes 3 $[(27 \times 1/60) \div (0.9 \times 1/6) = 3]$ tracks to record one field of television signal. Therefore, when the floppy-disc has 77 tracks, the floppy-disc recorder 10 can record 25 ($77 \div 3 = 25.6$) fields of television signal.

The detail of the still vision recording and reproducing system according to the present invention is described below.

Figure 2:
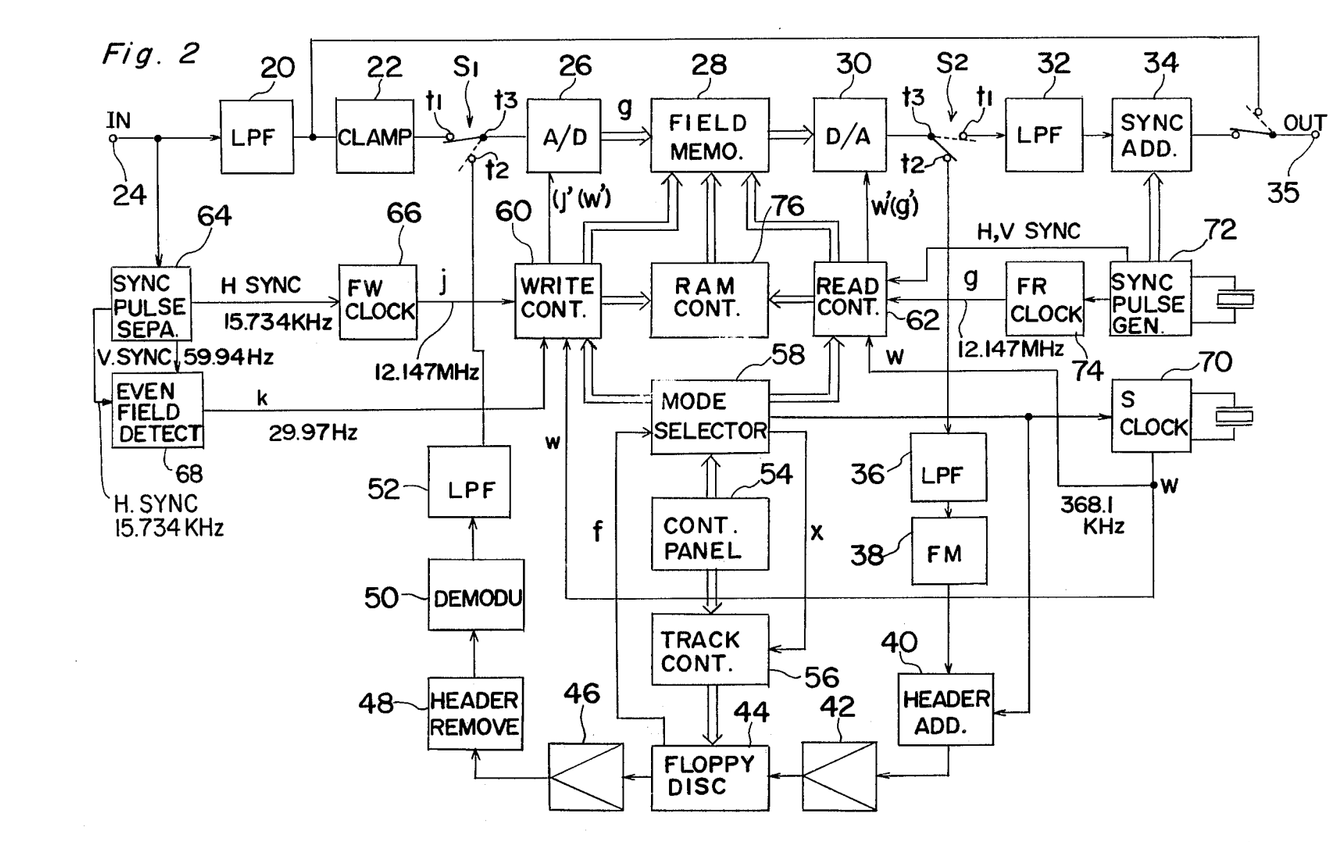
FIG. 2 is a detailed block diagram of a still vision recording and reproducing system according to the first embodiment of the present invention.

Referring to FIG. 2, there is shown a still vision recording and reproducing system according to the first embodiment of the present invention. The system shown comprises low pass filter 20 and clamp 22 connected in series between an input terminal 24 for receiving the television signal and terminal t1 of the switch S1. A/D converter 26, field memory 28 which corresponds to buffer memory 4 described above and D/A converter 30 are connected in series between the terminals t3 of the respective switches S1 and S2. The A/D converter 26 converts analogue television signal into 6-bit parallel digital signal. Similarly, the D/A converter 30 converts 6-bit parallel digital signal to analogue signal. The detail of the field memory 28 is described later in connection with FIG. 3. Low pass filter 32 and sync pulse adder 34 are connected in series between the terminal t1 of the switch S2 and an output terminal 35, which is in turn connected to the television signal processing stage. The terminal t2 of the switch S2 is connected through a low pass filter 36 and frequency modulator 38 to a header adder 40 which adds a header pulse in front of the leading edge of the successively coming FM signal. According to a preferred embodiment, the frequency modulator 38 is a pulse counter type or a phase locked loop type. The signal produced from the header adder 40 is amplified by an amplifier 42 and is recorded in the floppy-disc recorder 44. The output of the floppy-disc recorder 44 is connected through an amplifier 46 to a header remover 48 which removes the header pulse. The signal produced from the header remover 48 is applied through a demodulator 50 and low pass filter 52 to the terminal t2 of the switch S1.

Figure 5:
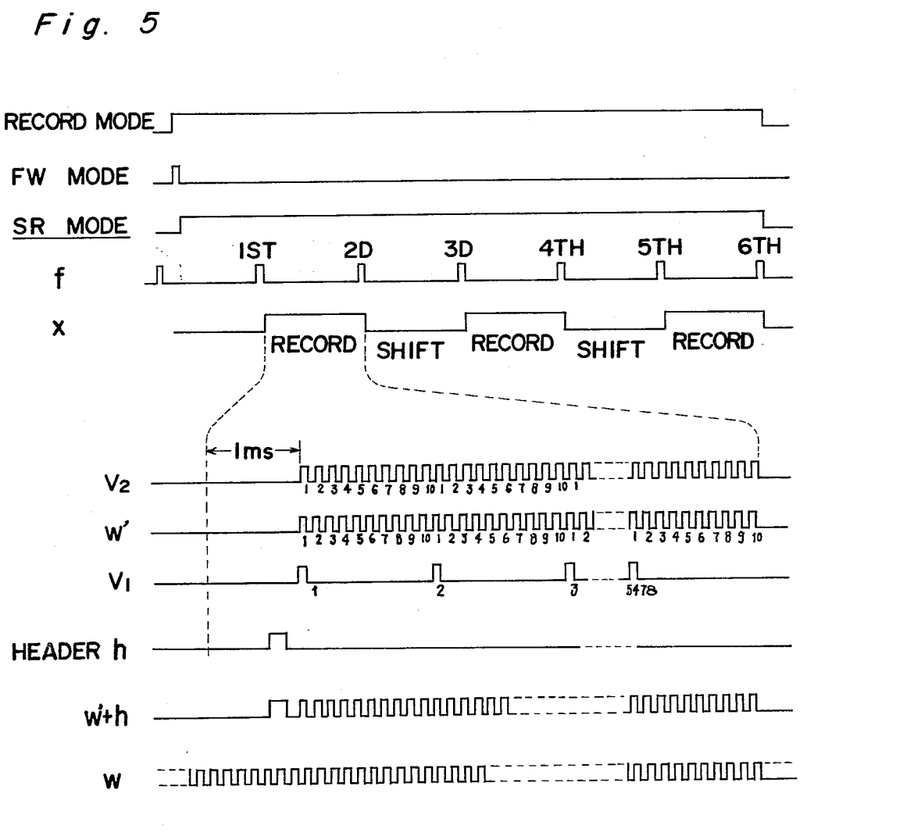

A control panel 54 is provided for allowing the operator to select the mode of operation and the tracks in the floppy-disc to which he is going to record or from which he is going to reproduce. More specifically, the control panel 54 includes buttons (not shown) for selecting one of the recording and playing modes, and buttons for selecting the section, or tracks, in the floppy-disc. During the recording mode, the television signal is recorded in the selected tracks, and during the playing mode, the television signal is reproduced from the selected tracks. The signal produced by the track selecting button is applied to a track control 56 which shifts a recording and reproducing head provided closely above one surface of the rotating floppy-disc. On the other hand, the signal produced from the mode selecting button is applied to a mode selector 58. When the operator selects the recording mode, the mode selector 58 first produces a signal indicative of fast writing (FW) mode to a write control 60, and then produces a signal indicative of slow read (SR) mode to a read control 62, in a predetermined timed relation as best shown in FIG. 5. It is to be noted that the floppy-disc recorder 44 also produces a pulse f per one rotation of the floppy-disc. When the floppy-disc rotates 6 times per second as explained in the above example, the pulse f has a frequency of 6 Hz. It is also to be noted that, by the receipt of the pulses f, the mode selector 58 produces a train of rectangular pulses x, as best shown in FIG. 5. The rectangular pulses x are applied to the track control 56 for controlling the shift of recording and reproducing head over three tracks during one slow reading or slow writing mode, and also are applied to the write control 60 and read control 62 for controlling the timed relation during the slow read and slow write modes.

Figure 4:
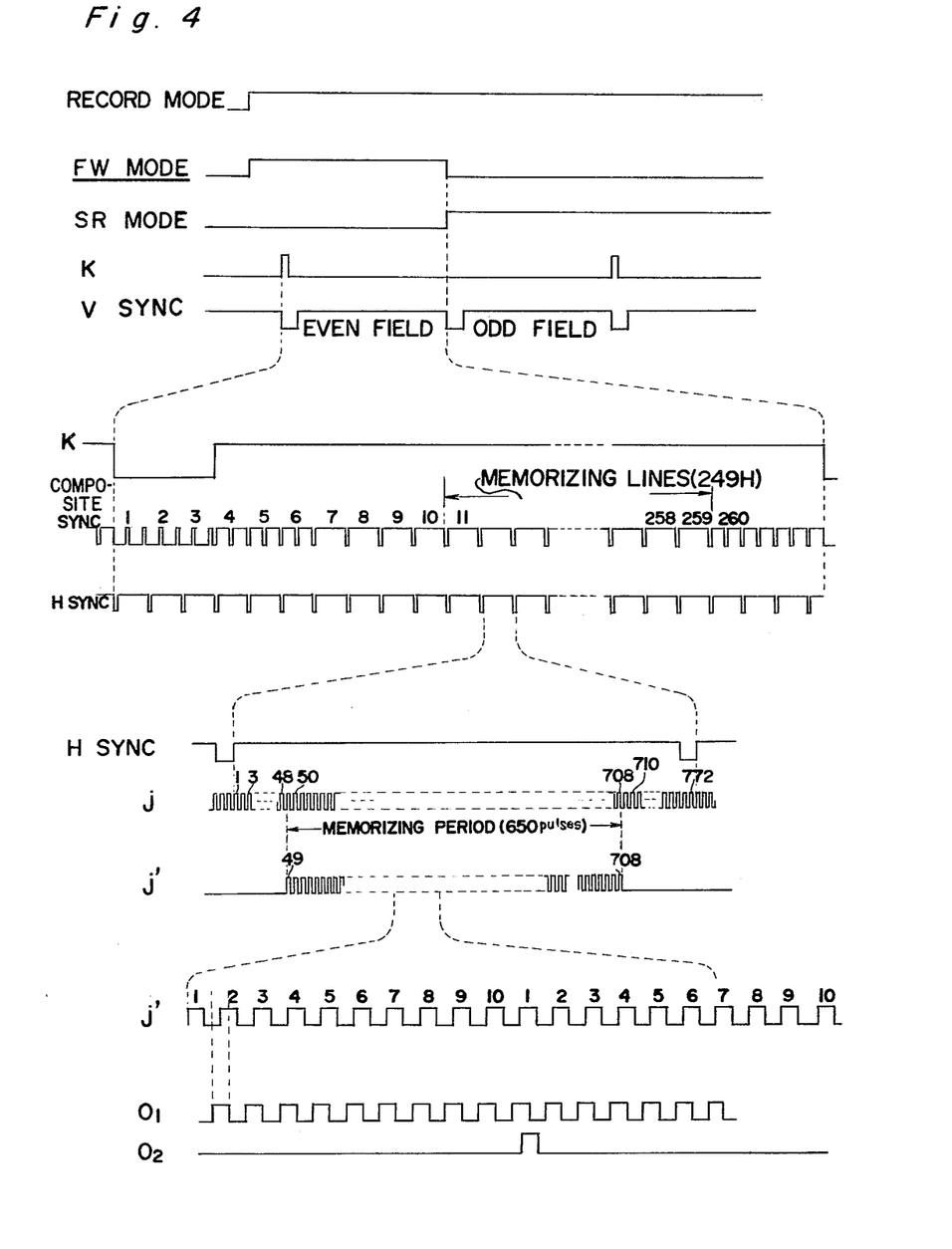
FIGS. 4, 5, 6 and 7 are graphs showing waveforms obtained from major elements in the block diagram of FIG. 3 during fast writing, slow reading, slow writing and fast reading modes, respectively.

The still vision recording and reproducing system of FIG. 2 further comprises a sync pulse separator 64 connected to the input terminal 24 for separating the vertical sync pulses and horizontal sync pulses. The separated horizontal sync pulses are applied to a fast writing clock pulse generator (referred to as FW clock) 66, which produces high frequency pulses j, e.g., 12.147 MHz which is substantially equal to 772 times the horizontal sync pulse frequency (15.734 KHz). The high frequency pulses j are applied to the write control 60. On the other hand, the separated vertical and horizontal sync pulses are applied to an even field detector 68, which produces a pulse k at the beginning of each even field, as shown in FIG. 4. In addition to the pulses j and k, the write control 60 also receives considerably low frequency (368.1 KHz) pulses w from a slow clock pulse generator (referred to as S clock) 70. The low frequency pulses w are also applied to the read control 62.

A sync pulse generator 72 is provided for generating horizontal and vertical sync pulses which are applied to the read control 62 and sync pulse adder 34. A fast reading clock pulse generator (referred to as FR clock) 74 is connected to a read control 62. The FR clock 74 produces a high frequency (12.147 MHz) pulses g.

The write control 60 and read control 62 are connected to A/D and D/A converters 26 and 30, respectively, and are also connected to a RAM control 76 and field memory 28. The detail of the field memory 28 is described below.

Figure 3:
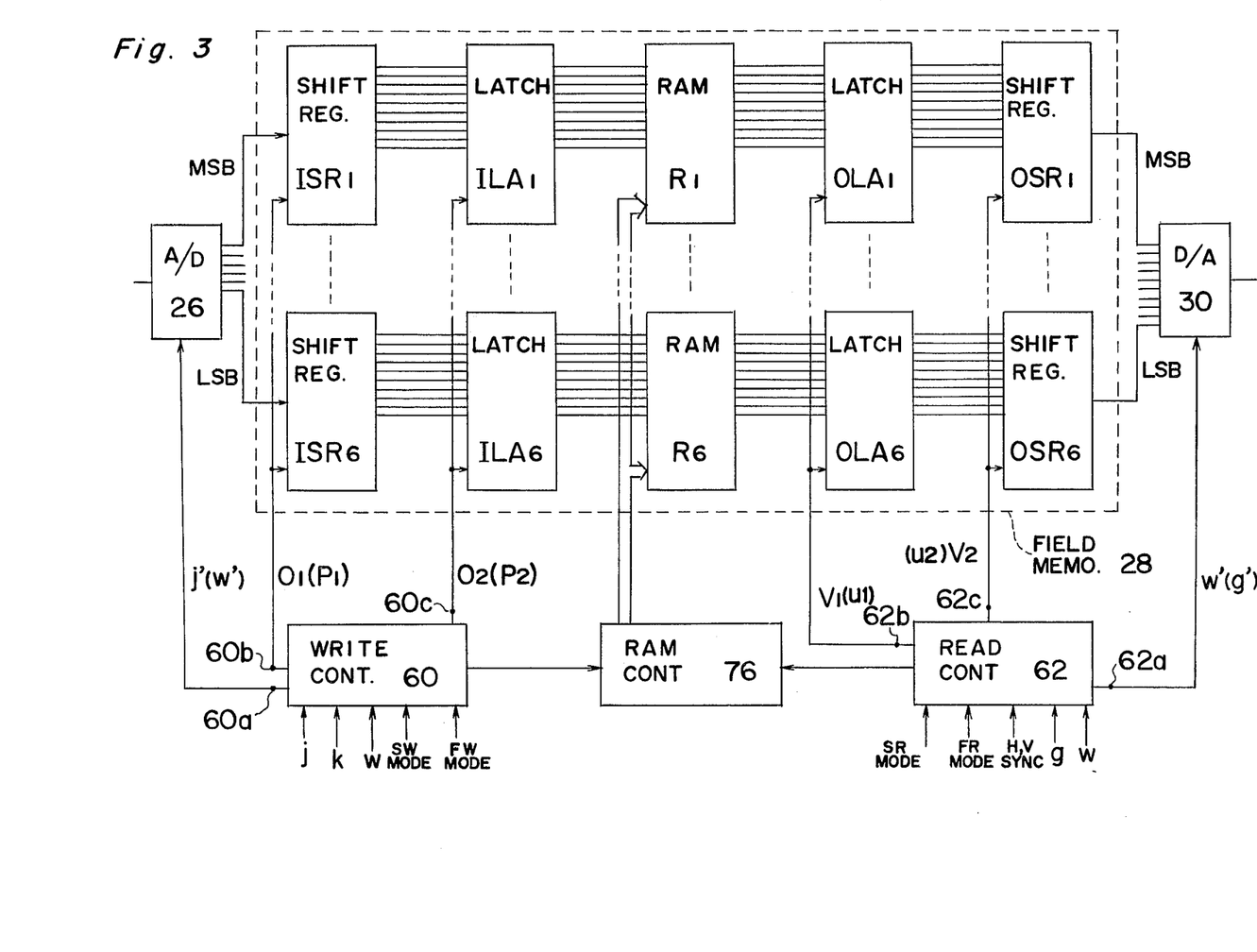
FIG. 3 is a block diagram showing a detail of a field memory employed in the system of FIG. 2.

Referring to FIG. 3, the field memory 28 includes a cascade connection of input shift register ISR1, input latch ILA1, random-access memory (RAM) R1, output latch OLA1 and output shift register OSR1. The field memory 28 further includes five more sets of the same cascade connection, thus in total, there are six sets of such cascade connections. In FIG. 3, there are shown only the first and sixth cascade connections. The input shift registers ISR1 to ISR6 are connected to each of the six outputs of the A/D converter 26. For example, the input of the shift register ISR1 is connected to the output of the A/D converter 26 that produces the most significant bit, and the input of the shift register ISR6 is connected to the output of the A/D converter 26 that produces the least significant bit. Each of the input shift registers ISR1 to ISR6 is capable of carrying 10 bits. Therefore, when the input shift register, e.g., ISR1, receives 10-bit digital signals in series from the A/D converter 26, it produces the 10-bit digital signals in parallel to the input latch ILA1. The input latch ILA1 then provides the 10-bit digital signals in parallel to the RAM R1. The sampling rate of the A/D converter 26, shifting speed in the input shift registers, and the rate of transmittal of the 10-bit parallel digital signals are controlled, respectively, by the pulses produced from terminals 60a, 60b and 60c of the write control 60. The address for specifying the section in RAMs and timed relation for storing the sequentially coming 10-bit parallel digital signals are controlled by a signal produced from the RAM control 76. It is to be noted that the RAMs R1 to R6 have a capacity large enough to store digital signals of one field of the television signal.

For reading the memorized digital signal in RAMs R1 to R6, the digital signal in RAM, e.g., R1, are sent by 10-bit parallel signals to the output latch OLA1 and further to the output shift register OSR1. The output shift register OSR1 then sequentially supplies the 10-bit digital signal to the D/A converter 30. The rate of transmittal of the 10-bit parallel signal, shifting speed in the output shift registers, and the rate of conversion into analogue signal are controlled by the pulses obtained from terminals 62b, 62c and 62a, respectively, of the read control 62. As understood to those skilled in the art, the analogue signal produced from the D/A converter 30 can be in a compressed or elongated form in time domain of the analogue signal applied to the A/D converter 26, depending on the frequency difference between the pulses applied to the A/D converter 26 and the D/A converter 30.

Next, the operation of the still vision recording and reproducing system of FIG. 1 is explained in the order of recording mode and playing mode.

First the operator selects a section, or tracks, in which one field of television signal is to be recorded in the floppy-disc, and selects the recording mode through the buttons provided on the control panel 54. By the selection of recording mode, the system automatically turns the switches S1 and S2 in the position shown by a real line, and then the mode selector 58 first provides a signal indicative of fast writing mode to the write control 60 and thereafter a signal indicative of slow reading mode to the read control 62. When the write control 60 receives the fast writing mode signal, it detects the pulse k that informs the leading edge of the even field of the television signal. According to a preferred embodiment, the write control 60 counts 10 horizontal pulses for eliminating the vertical blanking period, as understood from the waveform of even sync pulses shown in FIG. 4. Upon receipt of a horizontal sync pulse indicating the end of the 10th horizontal line period, the write control 60 starts to count the number of high frequency pulses j obtained from the FW clock 66, and when it receives 49th high frequency pulse j, the high frequency pulse j is applied through the write control 60 to the A/D converter 26 for carrying out the analogue to digital conversion of the television signal. The write control 60 continues to supply the high frequency pulses j until it counts up to 708th pulse so as to eliminate the horizontal blanking period. The extracted pulses in the above described manner from the train of pulses j are designated by a reference character j' and their waveform is shown in FIG. 4. During the supply of extracted pulses j', the write control 60 supplies a train of pulses $O_1$ (FIG. 4), having the same frequency as the pulses j but difference phase, to each one of the input shift registers ISR1 to ISR6. When 10 pulses are applied to the A/D converter 26, a pulse $O_2$ (FIG. 4) is applied to each one of the input latches ILA1 to ILA6 and also to the RAM control 76 for effecting the transmittal of 10-bit digital signals from each one of the input shift register to the corresponding RAM through the input latch. Such an operation is carried out for each of the horizontal sync period between 11th and 259th lines. When the memorizing operation of one even field in RAMs R1 to R6 is completed, the mode selector 58 automatically changes the mode from fast writing mode to slow reading mode, and provides a signal indicative of the slow reading mode to the read control 62.

When the slow reading mode takes place, the read control 62 receives pulse f from the floppy-disc recorder 44 through the mode selector 58 for determining the timed relation between the actuation of the D/A converter 30 and the recording procedure carried out in the floppy-disc recorder 44. When the read control 62 receives the first pulse f (FIG. 5) from the beginning of the slow reading mode, it counts a predetermined time interval, such as 1 ms, and then supplies low frequency pulses w', obtained from the S clock 70, to D/A converter 30, and at the same time, it supplies driving pulses v1 and v2 to the output latches OLA1 to OLA6 and output shift registers OSR1 to OSR6, respectively. The driving pulses V1 and V2 are also supplied to the RAM control 76. As understood from the waveform shown in FIG. 5, the pulse v1 is produced every 10 other pulses of the pulse w' and the pulse v2 has the same frequency as the pulse w' but different phase. Since the pulse w' supplied to the D/A converter 30 has a considerably low frequency than the pulse j' supplied to the A/D converter, it is understood that the analogue signal produced from the D/A converter 30 has a waveform (not shown) which corresponds to an expanded form in time domain of the waveform of the analogue signal applied to the A/D converter 26. The analogue signal produced from the D/A converter 30 is sequentially supplied through the switch S2 and low pass filter 36 to the frequency modulator 38. The header adder 40, which has been actuated by the mode selector 58, produces a header pulse h, as shown in FIG. 5, within the time interval of 1 ms after the very beginning of the first pulse f. Therefore, the FM signal that passes through the header adder 40 follows the header pulse h. The signal produced from the header adder 40 is amplified and then recorded in the floppy-disc recorder 44 along a track previously designated. When the floppy-disc completes one turn, the first $\frac{1}{3}$ of the even field television signal is recorded in the floppy-disc recorder 44, and thereupon, the recorder 44 produces the second pulse f which is applied through the mode selector 58 to the read control 62 to pause the driving of the D/A converter 30. After the second pulse f, the recording and reproducing head provided in the floppy-disc recorder 44 shifts to another track. Then, when the third pulse f is supplied to the mode selector 58, the read control 62 again starts to drive the D/A converter 30 for recording the second $\frac{1}{3}$ of the even field television signal in the newly provided track. Thereafter, a similar operation is carried out to record the third $\frac{1}{3}$ of the even field television signal in the further newly provided track. When the recording operation of the even field television signal in the three tracks of the floppy-disc completes, the system is reset, and is ready to receive a further instruction through the control panel 54.

Since there are still vacant, or unrecorded, tracks, the operator may continue to record his desired picture in the recorder 44. According to the present invention, since it only takes three tracks to record one field, the operator may record 25 different pictures in the recorder, provided that there are 77 tracks in the floppy-disc.

Next, the operation under the playing mode is explained.

Figure 6:
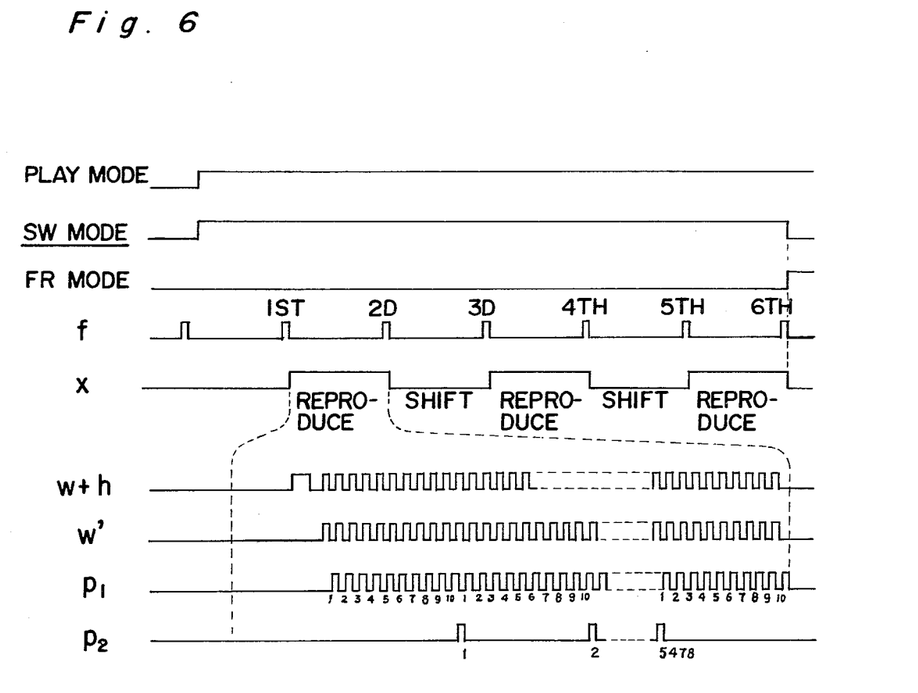

First, the operator selects a section in which his desired television signal is recorded in the floppy-disc, and selects the playing mode through the buttons provided on the control panel 54. By the selection of playing mode, the system automatically turns the switches S1 and S2 in the position shown by a dotted line, and then, the mode selector 58 first provides a signal indicative of the slow writing mode to the write control 60 and thereafter, a signal indicative of fast reading mode to the read control 62. When the write control 60 receives the slow writing mode signal, it detects the pulse f (FIG. 6) which comes first in the slow writing mode. Upon receipt of the first pulse f, the floppy-disc recorder 44 starts to reproduce the recorded signal, and at the same time, the write control 60 starts to provide driving pulse w', obtained from the S clock 70, to the A/D converter 26. In addition to the driving pulse w', the write control 60 also provides driving pulses p1 and p2 to the input shift registers ISR1 to ISR6 and input latches ILA1 to ILA6, respectively. The pulse p2 is produced every 10 other pulses of the pulse w', and the pulse p1 has the same frequency as the pulse w' but different phase, as shown in FIG. 6. Since the signal reproduced from the floppy-disc recorder 44 and amplified by the amplifier 46 has the header pulse h, the header h is removed by the header remover 48. Then, the FM signal is demodulated in the demodulator 50 and low pass filter 52, and is applied to the A/D converter 26. Thereafter, the reproduced television signal is memorized in the RAMs R1 to R6 in a manner similar to that described above by the use of pulses w', p1 and p2. When the television signal reproduced from the three tracks in the floppy-disc, the mode selector 58 automatically changes the mode from slow writing mode to fast reading mode.

Figure 7:
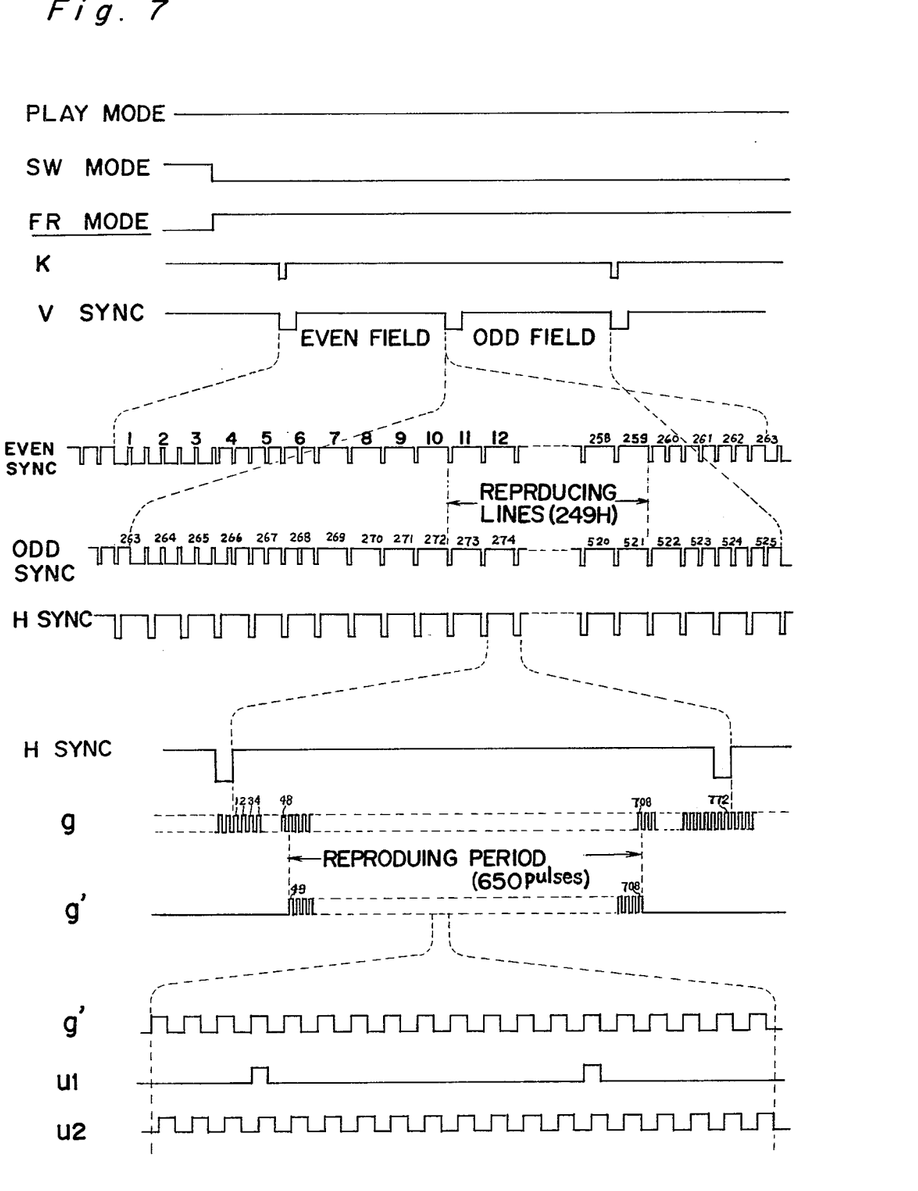

When the fast reading mode takes place, the read control 62 receives vertical sync pulse from the sync pulse generator 72 for determining the timed relation between the actuation of D/A converter 30 and the reproduction of original television signal in the sync pulse adder 34. When the read control 62 receives the first vertical sync pulse (FIG. 7), the sync pulse generator 72 supplies even field sync pulses in the vertical blanking period to the sync pulse adder 34 and also to the read control 62. When the read control 62 detects the end of 10th horizontal line period, it stops the sync pulse generator 72 from supplying the even field sync pulses to the sync pulse adder 34, and at the same time, it starts to count 48 g pulses for the insertion of horizontal blanking period. Thereafter, the pulses g', u1, and u2, shown in FIG. 7, are applied to D/A converter 30, output latches OLA1 to OLA6 and output shift registers OSR1 to OSR6, respectively, for effecting the read out of memorized television signal in the RAMs R1 to R6. Since the rate of reading out operation in this FR mode is controlled by the high frequency pulses g, the television signal produced from the D/A converter 30 has the same frequency as that of the original television signal. By adding the vertical and horizontal sync pulses in the respective blanking period, the television signal produced from the sync pulse adder 34 can be used as a proper television signal for producing a picture on the cathode ray tube. It is to be noted that a similar operation is carried out during the odd field period using the same signal memorized in RAMs. The operation of fast reading mode is carried out number of times repeatedly until the operator actuates the button or switch provided on the control panel 54 to stop the play mode.

Figure 8:
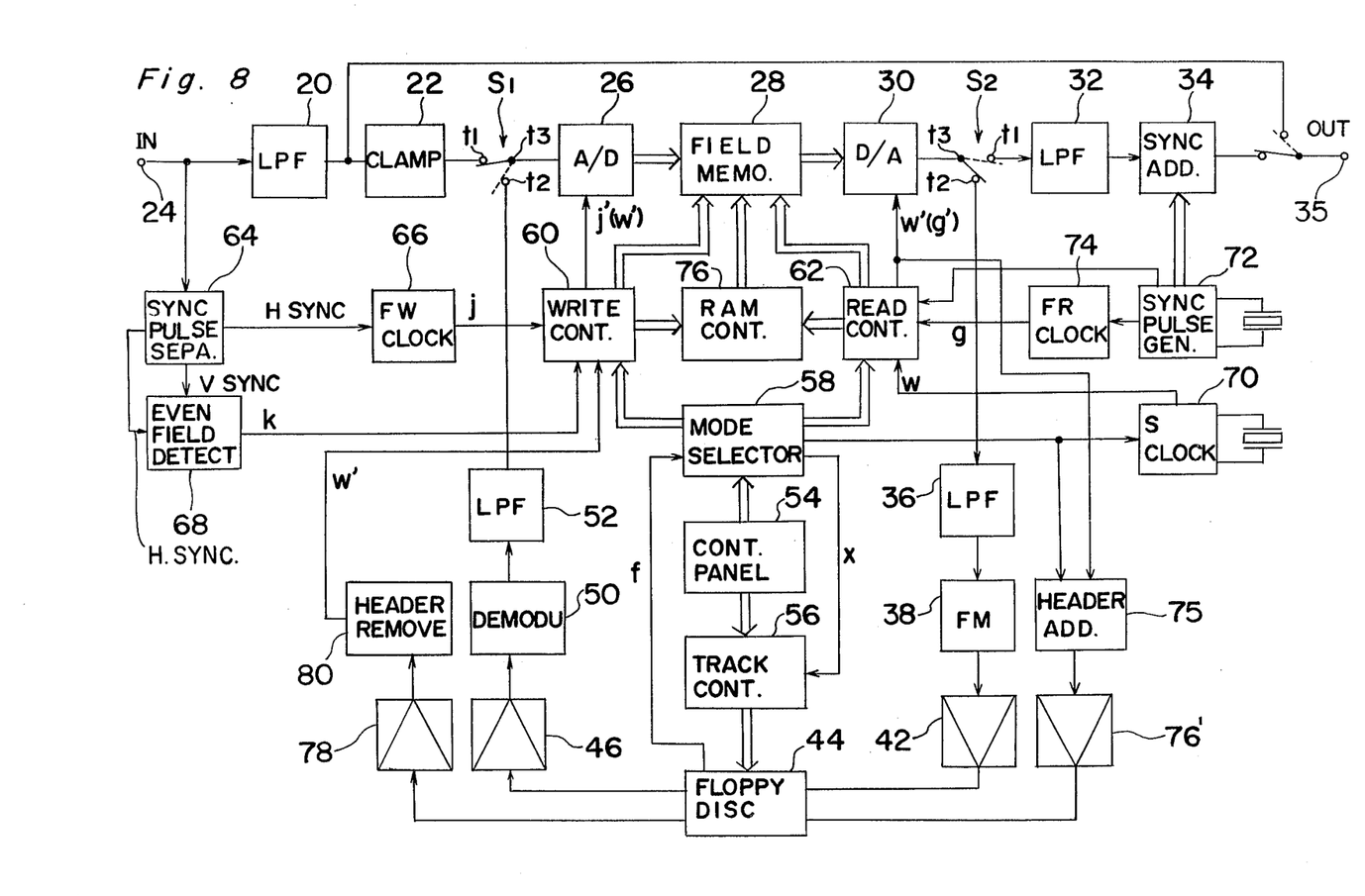
FIG. 8 is a block diagram of a still vision recording and reproducing system according to the second embodiment of the present invention.

Referring to FIG. 8, there is shown a still vision recording and reproducing system according to the second embodiment of the present invention. When compared with the system of the first embodiment shown in FIG. 2, the system of the second embodiment has following differences. Firstly, the low frequency pulse w produced from the S clock 70, which has been described as applied to each one of the write control 60 and read control 62, is applied only to the read control 62. Secondly, the header adder 40, which has been described as provided between the frequency modulator 38 and the amplifier 42, is eliminated. Thirdly, a new header adder 75 coupled with an amplifier 76' is provided. The new header adder 75 receives the pulse produced from the read control 62 for driving the D/A converter 30 and also the pulse f from the mode selector 58. The pulse produced from the amplifier 76' is memorized in the floppy-disc on a surface opposite to that used for memorizing the frequency modulated television signal. Since the recording and reproducing head provided in the floppy-disc recorder 44 for recording and reproducing signals in one surface of the floppy-disc is provided in face-to-face relation through floppy-disc with the other head provided for recording and reproducing signals in the other surface, and since these two recording heads shift simultaneously with each other, the tracks that records the pulses obtained from the amplifier 76' are aligned with the tracks that records the frequency modulated television signal. Fourthly, the header remover 48 is eliminated. And lastly, a new header remover 80 coupled with an amplifier 78 is provided. The amplifier 78 receives the reproduced pulses from the floppy-disc recorder 44 and the header remover 80 supplies the reproduced pulse to the write control 60.

In summary, the system according to the second embodiment shown in FIG. 8 has such a structure that the write control 60 uses low frequency pulses w' which have been recorded and reproduced from the floppy-disc recorder 44, instead of the low frequency pulses w directly obtained from the S clock 70, for controlling the writing of television signal in field memory 28 during the slow write mode. When the system of the second embodiment is employed, the disadvantageous effect, such as frequency deviation caused by the wow flutter of the floppy-disc recorder 44, can be eliminated. When there is a wow flutter, the frequency deviation will be adversely affected on both the FM television signal and pulses w'. Therefore, by the use of pulses w', which has been passed through the floppy-disc recorder 44, the frequency deviation contained in the demodulated television signal can be counterbalanced with the frequency deviation contained in the pulses w'. The operation of the still vision recording and reproducing system of the second embodiment is explained below.

During the fast writing mode, the A/D converter 26 and the field memory 28 are controlled to write one even field television signal by the high frequency pulse j obtained from the FW clock 66 in the same manner described above.

When the mode is changed to the slow reading mode, the read control 62 provides low frequency pulses w' to the D/A converter 30 and modified pulses v1 and v2 to the field memory 28 to incessantly produce analogue television signal at the speed much slower than that of the original television signal. The pulses w' produced from the read control 62 is also applied to the header adder 75 which adds the header pulse h in front of the successively coming pulses w' (see FIG. 5 waveform w'+h). Simultaneously with the transmittal of the pulses w' to the header adder 75, the television signal produced from the D/A converter 30 is applied through the low pass filter 36 to the frequency modulator 38. Thus, the leading edge of the frequency modulated signal produced from the amplifier 42 alignes with the leading edge of the pulses w'. Then, the FM signal is recorded on one surface of the floppy-disc and the pulses w' are recorded on the other surface of the floppy-disc, in a similar manner described above, using three tracks for each of the FM signal and pulses w'.

When the system is turned by the operation through control panel 54 to the slow writing mode, the recorded FM signal and pulses w' are read out simultaneously and are applied to demodulator 50 and header remover 80, respectively. The demodulated television signal is applied to the A/D converter 26 for the A/D conversion and the pulses w' are applied through the write control 60 to the A/D converter 26 for the control of sampling rate of the A/D conversion. In addition to the pulses w', the write control 60 supplies modified pulses p1 and p2 to the field memory. It is needless to say that these pulses p1 and p2 are formed by the use of the pulses w'.

Thereafter, when the mode is changed to fast reading mode, the read control 62 provides high frequency pulses g' to the D/A converter 30 and modified pulses u1 and u2 in the same manner described above for producing the original television signal from the output terminal 35.

Figure 9:
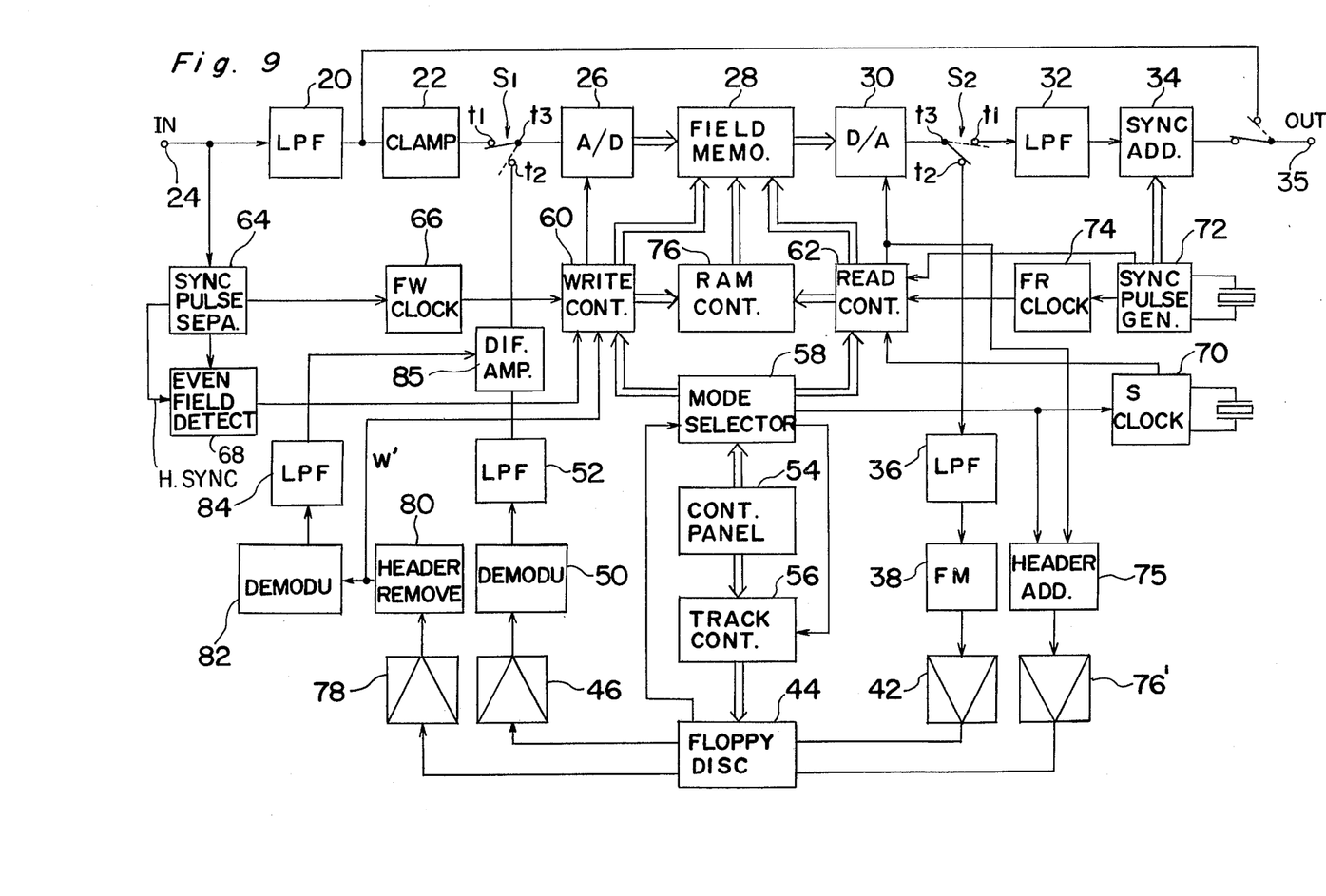
FIG. 9 is a view similar to FIG. 8 but particularly showing a modification thereof.

Referring to FIG. 9, there is shown a first modification of the second embodiment of the present invention. The system according to FIG. 9 further includes, when compared with the system shown in FIG. 8, a demodulator 82 connected to the header remover 80, a low pass filter 84 connected to the demodulator 82 and a differential amplifier 85 which receives the demodulated television signal from the low pass filter and demodulated pulse w' from the low pass filter 84 for taking the difference therebetween and provides the difference signal through the switch S1 to the A/D converter 26.

When the wow flutter is present, it adversely affects the reproduced television signal in two different manners; one is the frequency deviation between the television signal and low frequency pulses w'; and the other is the amplitude distortion of the demodulated television signal. The system shown in FIG. 8 corrects the frequency deviation as described above, and the system shown in FIG. 9 further corrects the amplitude distortion.

When the pulse w' is demodulated by the demodulator 82, a slowly varying distortion wave which is imposed on the reproduced television signal is produced from the low pass filter 84. In the differential amplifier 85, the reproduced television signal is subtracted by the slowly varying distortion wave so that the signal produced from the differential amplifier 85 contains almost no amplitude distortion.

Figure 10:
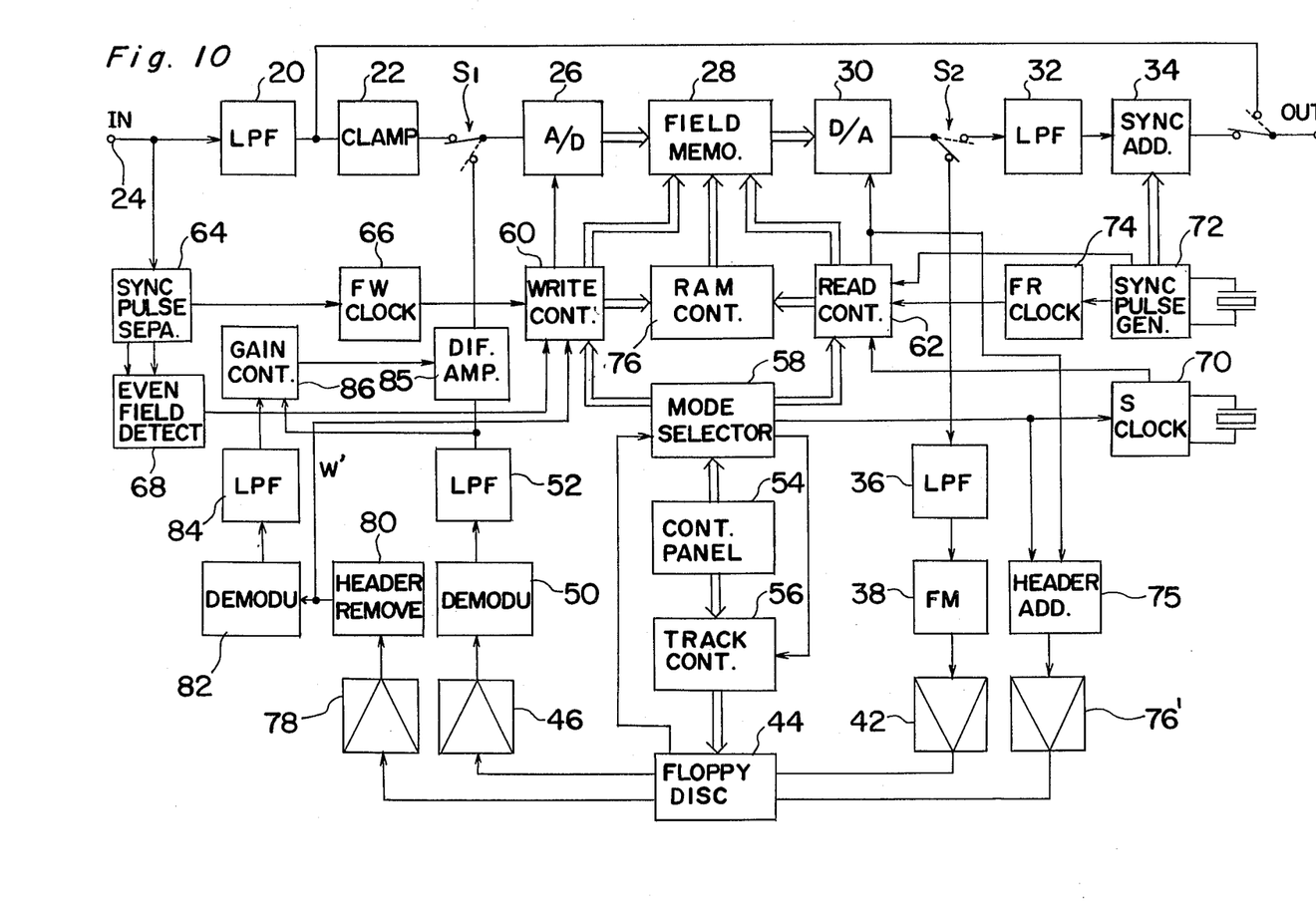
FIG. 10 is a view similar to FIG. 8 but particularly showing a further modification thereof.

Referring to FIG. 10, there is shown a second modification of the second embodiment of the present invention. The system according to FIG. 10 further includes a gain control 86 inserted between the low pass filter 84 and the differential amplifier 85 and connected with the output of the low pass filter 52 for the improvement of the elimination of the amplitude distortion.

The amplitude distortion in the demodulated television signal is caused by the frequency deviation during the recording and reproducing processes carried out in the floppy-disc recorder 44. Therefore, the amplitude distortion changes relatively to the amplitude of the demodulated television signal. From this stand point, the gain control 86 changes the amplitude of the slowly varying distortion wave relatively to the amplitude of the demodulated television signal. For example, the gain control 86 increases the amplitude of the slowly varying distortion wave where the amplitude of the demodulated television signal is considerably high and decreases the same where the amplitude of the demodulated television signal is considerably low.

It is to be noted that the high frequency pulse generators, e.g., FW clock 66 and FR clock 74, and the low frequency pulse generators, e.g., S clock 70, can be formed by a signal pulse generator in combination with pulse divider and pulse multiplier.

It is also to be noted that the field memory 28, which has been described as formed by RAMs can be formed by a bucket brigade device (BBC) or charge coupled device (CCD). In this case it is not necessary to provide A/D converter 26 and D/A converter 30.

It is to be noted that the still vision recording and reproducing system according to the present invention can be employed in a television receiver.

It is also to be noted that, although the above embodiments are particularly directed to NTSC systems it is possible to employ the present invention in PAL system or SECAM system.

It is further to be noted that, by the multi-signal imposing technique, the clock pulse can be imposed on the television, or information, signal for recording two types of signals in the same track.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A still vision recording and reproducing system comprising:

first switch means having first, second and third terminals, said third terminal being selectively connectable to either one of said first or second terminals, said first terminal having an input that includes a television signal;

memory means connected to said third terminal of said first switch means for storing the television signal;

second switch means having first, second and third terminals, said memory means being connected to said second switch means' third terminal which is selectively connectable to either one of said first or second terminals of the second switch means, said first terminal of the second switch means being adapted to supply television signal of still vision;

a frequency modulator connected to said second terminal of the second switch means;

recorder means including a record connected to said frequency modulator;

a demodulator connected between said recorder means and said second terminal of the first switch means;

mode control means connected to the first and second switch means for controlling the mode of operation between a recording mode and a playing mode thereof, respectively;

said first switch means being so actuated during said recording mode as to connect its third terminal with its first terminal for writing the television signal in said memory means, and said second switch means being so actuated as to connect its third terminal with its second terminal for reading the memory means and sending a written television signal in expanded form in time domain through said frequency modulator to said recorder means for recording said television signal;

said first switch means being so actuated during said playing mode as to connect its third terminal with its second terminal for writing the television signal, which has been reproduced from the recorder means and demodulated in said demodulator, in said memory means, and said second switch means being so actuated as to connect its third terminal with its first terminal for reading the memory means and sending out the written television signal in compressed form in time domain for the reproduction thereof as a still vision;

low frequency pulse supplying means coupled to said mode control means for supplying low frequency pulses to said memory means during said recording mode for affecting the reading of the television signal at a low speed;

means for diverging said low frequency pulses from said low frequency pulse supplying means;

means for supplying said diverged low frequency pulses to said recorder for recording said diverged low frequency pulses on said record simultaneously with the recording of said television signal on said record; and means for reproducing said recorded low frequency pulses simultaneously with the reproduction of said recorded television signal.

2. A still vision recording and reproducing system as claimed in claim 1 wherein said recorder means is a floppy-disc recorder including a floppy-disc having first and second flat surfaces, said floppy-disc recorder for the recording of the pulses and the signals on the first and second flat surfaces at the same time.

3. A still vision recording and reproducing system as claimed in claim 2 further comprising a wow flutter detector connected to the floppy disc for detecting the wow flutter in said floppy-disc recorder.

4. A still vision recording and reproducing system as claimed in claim 3 wherein said wow flutter detector comprises a pulse frequency demodulator for affecting the frequency demodulation of the reproduced low frequency pulses to produce a demodulated television signal for producing a slowly varying distortion wave indicative of the wow flutter.

5. A still vision recording and reproducing system as claimed in claim 4 further comprising a differential amplifier which receives the demodulated television signal and the wave indicative of the wow flutter and produces a television signal in which the wow flutter is eliminated.

6. A still vision recording and reproducing system as claimed in claim 5 further comprising a gain control inserted between said pulse frequency demodulator and said differential amplifier and connected with the demodulator for automatically controlling the gain of the slowly varying distortion wave relatively to the amplitude of the demodulated television signal.

7. A still vision recording and reproducing system as claimed in claim 2 further comprising means for adding a header pulse in front of said low frequency pulses which are to be recorded in the floppy-disc recorder; and means for removing the header pulse from the low frequency pulses after it is reproduced from the floppy-disc recorder.

* * * * *